United States Patent [19]

Liu

[11] Patent Number: 5,210,848
[45] Date of Patent: May 11, 1993

[54] MULTI-PROCESSOR CACHES WITH LARGE GRANULARITY EXCLUSIVITY LOCKING

[75] Inventor: Lishing Liu, Pleasantville, N.Y.

[73] Assignee: International Business Machines Corporation, Armonk, N.Y.

[21] Appl. No.: 912,133

[22] Filed: Jul. 9, 1992

Related U.S. Application Data

[63] Continuation of Ser. No. 313,695, Feb. 22, 1989, abandoned.

[51] Int. Cl.$^5$ .............................................. G06F 12/14
[52] U.S. Cl. .............................. 395/425; 364/DIG. 1
[58] Field of Search ... 364/200 MS File, 900 MS File; 395/400, 425

[56] References Cited

U.S. PATENT DOCUMENTS

| | | | |
|---|---|---|---|
| 3,735,360 | 5/1973 | Anderson et al. | 340/172.5 |
| 3,771,137 | 11/1973 | Barner et al. | 340/172.5 |
| 4,142,234 | 2/1979 | Bean et al. | 364/200 |
| 4,394,731 | 7/1983 | Flusche et al. | 394/425 |
| 4,503,497 | 3/1985 | Krygowski et al. | 364/200 |
| 4,513,367 | 4/1985 | Chan et al. | 364/200 |
| 4,622,631 | 11/1986 | Frank et al. | 395/800 |
| 4,663,709 | 5/1987 | Fujiwara et al. | 364/200 |
| 4,716,528 | 12/1987 | Crus et al. | 395/650 |
| 4,733,352 | 3/1988 | Nakamura et al. | 364/200 |
| 4,775,955 | 10/1988 | Liu | 364/900 |
| 4,794,521 | 12/1988 | Ziegler et al. | 364/200 |
| 4,852,412 | 4/1989 | Sager et al. | 364/200 |
| 4,916,604 | 4/1990 | Yamamoto | 364/200 |
| 4,959,777 | 8/1990 | Holman, Jr. | 395/325 |
| 5,025,365 | 6/1991 | Mathur et al. | 364/200 |
| 5,029,070 | 7/1991 | McCarthy et al. | 395/425 |
| 5,043,886 | 8/1991 | Witek et al. | 395/425 |
| 5,123,095 | 6/1992 | Papadopoulos et al. | 395/375 |
| 5,140,685 | 8/1992 | Sipple et al. | 395/425 |

FOREIGN PATENT DOCUMENTS 0212678 10/1987 European Pat. Off. .

OTHER PUBLICATIONS

Wei C. Yen et al., Data Coherence Problem in a Multicache System, IEEE Transactions on Computers, vol. C-34, No. 1, Jan., 1985, pp. 56-65.

Tang "Cache System Design in the Tightly Coupled Multiprocessor System," National Computer Conference, 1976, pp. 749-753.

Censier et al. "A New Solution to Coherence Problems in Multicache Systems" IEEE Transactions on Computers, vol. C-27, No. 12, Dec. 1978, pp. 1112-1118.

Primary Examiner—Joseph L. Dixon
Assistant Examiner—Reba I. Elmore
Attorney, Agent, or Firm—Whitham & Marhoefer

[57] ABSTRACT

A tightly coupled multi-processor (MP) system is provided with large granularity locking of exclusivity in multi-processor caches. The unique access right for a processor $P_i$ is enforced by giving other central processors (CPs) a temporarily invalid (TI) state on block B, even though some lines in the block B may still be resident in the cache. Any CP trying to access a block in the TI state will need to talk to the storage control element (SCE) to obtain proper authorization (e.g., RO or EX state) on the block. Assuming that a CP may have three states on a block B, temporarily invalid $TI_B$, read only $RO_B$ and exclusive $EX_B$, $TI_B$ is the initial state for all B at all CPs.

9 Claims, 7 Drawing Sheets

MULTI-PROCESSOR CACHES WITH LARGE GRANULARITY EXCLUSIVITY LOCKING

CROSS-REFERENCE TO RELATED APPLICATION

This application is a continuation application of application Ser. No. 313,695 filed Feb. 22, 1989, now abandoned.

BACKGROUND OF THE INVENTION

1. Field of the Invention

This invention generally relates to control of cache memories in a multi-processor (MP) data processing system and, more particularly, to an implementation for large granularity locking of exclusivity (EX) in multi-processor caches.

2. Description of the Prior Art

High performance, MP computer systems are being developed to increase throughput by performing in parallel those operations which can run concurrently on separate processors. Such high performance, MP computer systems are characterized by multiple central processor (CPs) operating independently and in parallel, but occasionally communicating with one another or with a main storage (MS) when data needs to be exchanged. The CPs and the MS have input/output (I/O) ports which must be connected to exchange data.

In the type of MP system known as the tightly coupled multi-processor system in which each of the CPs have their own caches, there exist coherence problems at various levels of the system. More specifically, inconsistencies can occur between adjacent levels of a memory hierarchy. The multiple caches could, for example, possess different versions of the same data because one of the CPs has modified its copy. It is therefore necessary for each processor's cache to know what has happened to lines that may be in several caches at the same time. In a MP system where there are many CPs sharing the same main storage, each CP is required to obtain the most recently updated version of data according to architecture specifications when access is issued. This requirement necessitates constant monitoring of data consistency among caches.

A number of solutions have been proposed to the cache coherence problem. Early solutions are described by C. K. Tang in "Cache System Design in the Tightly Coupled Multiprocessor System", *Proceedings of the AFIPS* (1976), and L. M. Censier and P. Feautrier in "A New Solution to Coherence Problems in Multicache Systems", *IEEE Transactions on Computers*, December 1978, pp. 1112 to 1118. Censier et al. describe a scheme allowing shared writable data to exist in multiple caches which uses a centralized global access authorization table. However, as the authors acknowledge in their Conclusion section, they were not aware of similar approaches as described by Tang two years earlier. While Tang proposed using copy directories of caches to maintain status, Censier et al. proposed to tag each memory block with similar status bits.

These early approaches revolve around how to do bookkeeping in order to achieve cross-interrogates (XI) when needed. The idea was to record at the global directory (copies or memory tags) information about which processor caches owns a copy of a line, and which one of the caches has modified its line. The basic operation is to have the global table record (with a MODIFIED bit) status when a processor stores into a line. Since store-in caches are used, the processor cache controller knows, from its cache directory, which lines are modified or private. A store into a non-modified line at a processor will necessitate synchronization with the storage controller and obtaining the MODIFIED status first. Therefore, a storage block cannot be exclusive, or modifiable, for a processor unless the processor has actually issued a store into it, even when the cache has the only copy of the line in the system.

The EX status in a more general sense, as described in U.S. Pat. No. 4,394,731 to Flusche et al., can allow a processor to store into the cache without talking to the storage control element (SCE), even when the line was never stored into the cache. This is a subtle difference but is rather important from a conceptual point of view, since it allows, for example, in an IBM/3081 system, acquiring EX status of a line at a processor when a subsequent store is "likely" to come.

There are various types of caches in prior art MP systems. One type of cache is the store through (ST) cache as described in U.S. Pat. No. 4,142,234 to Bean et al. for the IBM System/370 Model 3033 MP. ST cache design does not interfere with the CP storing data directly to the main storage (or second level cache) in order to always update changes of data to main storage. Upon the update of a store through to main storage, appropriate cross-interrogate (XI) actions may take place to invalidate possible remote copies of the stored cache line. The storage control element (SCE) maintains proper store stacks to queue the main storage (MS) store requests and standard communications between buffer control element (BCE) and SCE will avoid store stack overflow conditions. When the SCE store stack becomes full, the associated BCE will hold its MS stores until the condition is cleared.

Another type of cache design is the store-in cache (SIC) as described, for example, in U.S. Pat. No. 3,735,360 to Anderson et al. and U.S. Pat. No. 3,771,137 to Barner et al. A SIC cache directory is described in detail in the aforementioned U.S. Pat. No. 4,394,731 to Flusche et al. in which each line in a store-in cache has its multi-processor shareability controlled by an exclusive/read only (EX/RO) flag bit. The main difference between ST and SIC caches is that, all stores in SIC are directed to the cache itself (which may cause a cache miss if the stored line is not in the SIC cache). It is also proposed in U.S. Pat. No. 4,503,497 to Kygowski et al. that data transfers upon a miss fetch can take place through a cache-to-cache transfer (CTC) bus if a copy is in the remote cache. A SCE is used that contains copies of the directories in each cache. This permits cross-interrogate (XI) decisions to be resolved at the SCE. Usually, cache line modifications are updated to main storage only when the lines are replaced from the cache.

In conventional cross-interrogate (XI) methods, when a block B is locked EX for CP $P_i$, any existing first level lines covered by block B in remote caches will be invalidated. When the block size is bigger than first level line size, this often results in redundant XI-invalidates; i.e., lines get invalidated without being modified at other CPs. The overhead due to extra cache misses and directory handling becomes intolerable when the block size is much (e.g., 16 times) bigger than the line size.

From experiments, significant spatial localities have been observed for both fetches and stores. Performing EX locking with bigger granularity blocks is able to reduce the rate of Non-EX-stores significantly. As a result, it is valuable to be able to perform large granularity EX locking without causing the above-mentioned performance overhead.

SUMMARY OF THE INVENTION

It is therefore an object of the present invention to provide an implementation for large granularity locking of exclusivity in multi-processor caches.

According to the invention, the unique access right for a processor $P_i$ is enforced by giving other central processors (CPs) a temporarily invalid (TI) state on block B, even though some lines in B may still be resident in the cache. Any CP trying to access a block in TI state will need to talk to the storage control element (SCE) to obtain proper authorization (e.g., RO or EX state) on the block. Assuming that a CP may have three states on a block B, a temporarily invalid state $TI_B$, a read only state $RO_B$ and an exclusive state $EX_B$, the temporarily invalid state $TI_B$ is the initial state for all blocks B at all CPs. The basic operations of the large granularity locking mechanism according to the invention are as follows:

(1) For the case where a processor $P_i$ stores into a line L in block B and $P_i$ does not have $EX_B$ state, the buffer control element (BCE) should request $EX_B$ state from the SCE. If this is the first store into L since $P_i$ obtained $EX_B$ state, the SCE communicates an XI-invalidate signal for line L from remote caches. This XI-invalidate is also done when the SCE grants $EX_B$ to $P_i$. Fetch requests with store intent are also handled similarly.

(2) When a processor $P_i$ fetches data in B with $TI_B$ state, the BCE requests a $RO_B$ state from the SCE before accessing, even for a cache hit.

(3) When the SCE receives an $EX_B$ request from a processor $P_i$, the SCE signals $TI_B$ state to all remote CPs before granting $EX_B$ to $P_i$. If it happens that a remote CP $P_j (j \neq i)$ owns the $EX_B$ state, the SCE makes sure that processor $P_j$ has obtained a $TI_B$ state before granting the $EX_B$ request to processor $P_i$.

(4) When the SCE receives a $RO_B$ request from a processor $P_i$, the SCE grants the request right away if none of the remote CPs owns the $EX_B$ state. Otherwise, the SCE grants the request only after making sure that the remote CP $P_j$ has turned its $EX_B$ state into a $RO_B$ state.

From (1), it will be observed that a line gets XI-invalidated from a cache only when it is actually modified remotely. As a result, the process according to the invention does not suffer the overhead due to excessive invalidates. This can be realized easily. At the SCE, a bit vector CH (change-local) is maintained for each block B locked EX for, say, processor $P_i$, when it is actually stored by $P_i$ since the last time the $EX_B$ state is granted to processor $P_i$. The CH-bit is initialized to zero bits when $P_i$ acquires the $EX_B$ state. When a store into a line L of block B is received by the SCE, the following operations are done. If the CH-bit associated with L is OFF, the SCE sends out XI-invalidate signals to remote caches. The CH-bit for L is then turned ON.

In an implementation of the large granularity lock scheme according to a preferred embodiment of the invention, a key factor is the recording of states of blocks for CPs at the SCE and BCEs. At the SCE, it is assumed that the lock tables $\{T_i | 1 \leq i \leq K\}$; that is, the SCE keeps track of only ownerships of EX states.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 1:
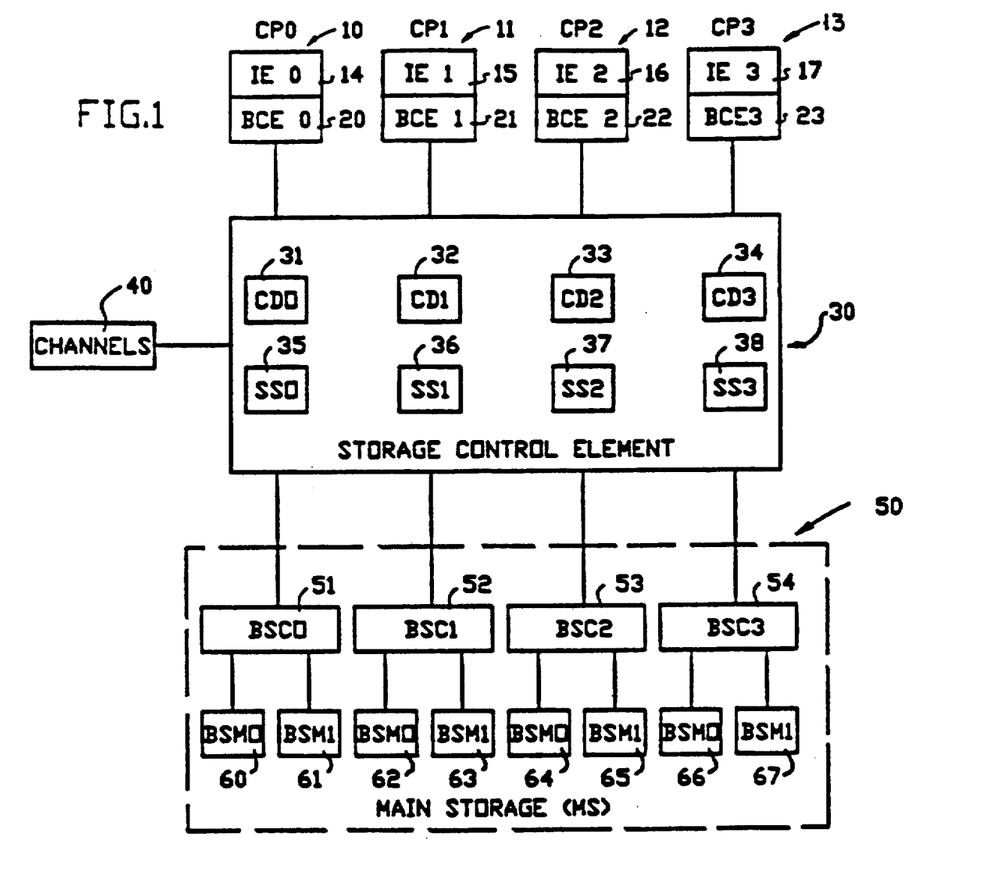
FIG. 1 is a block diagram of a multi-processing system in which the present invention may be used.

Referring now to the drawings, and more particularly to FIG. 1, there is illustrated in block diagram form a multi-processor (MP) system of the type in which the invention may be used. The MP system comprises four central processors ($CP_0$, $CP_1$, $CP_2$, and $CP_3$) 10, 11, 12, and 13 in which each CP includes an instruction execution (IE) unit 14, 15, 16, and 17 and buffer control unit (BCE) 20, 21, 22, and 23, respectively. Each IE unit includes hardware and microcode that issue instructions that require the fetching and storing of operands in main storage (MS) 50.

The IE units 14 to 17 begin a fetching or storing operation by issuing a fetch or store command to their respective cache controls BCEs 20 to 23, which include a processor store through (ST) cache with its associated processor cache directory (PD) and all processor cache controls which are exclusively used by their associated CPs 10 to 13. The CP generally issues a fetch or store command for each doubleword (DW) unit required by an operand. If the cache line containing the DW is in the PD, which is a cache hit, the DW is fetched or stored in the cache in accordance with the command. For an operand fetch hit in cache, the storage access is completed without any need to go outside of the BCE. Occasionally, the required DW is not in the cache, which results in a cache miss. Before the IE fetch or store command can be completed, the DW must be fetched from the main storage. To do this, the BCE generates a corresponding fetch or store miss command which requests the storage control element (SCE) 30 to obtain from main storage 50 a line unit of data having the DW required by the IE unit. The line unit will be located in the main storage 50 on a line boundary, but the required DW will be the first DW in the fetched line to be returned to the requesting BCE in order to keep the IE request going before the completion of the missed line transfer.

SCE 30 connects to the CPs 10 to 13 and main storage 50. Main storage 50 is comprised of a plurality of basic storage module (BSM) controllers $BSC_0$, $BSC_1$, $BSC_2$, and $BSC_3$ (51, 52, 53, and 54, respectively) in which each basic storage controller connects to two BSMs 0 (60, 62, 64, and 66) and 1 (61, 63, 65, and 67). The four BSCs 51 to 54 are each connected to the SCE 30.

In prior systems, the SCE 30 contains four copy directories (CDs) 31, 32, 33, and 34, each containing an image of the contents of a corresponding processor cache directory (PD) in one of the BCEs in a manner similar to that described in U.S. Pat. No. 4,394,731 to Flusche et al. As will become clear from the following description, the subject invention does not need to employ CDs, although it is possible to further reduce the amount of XI-invalidates through other directories recording line presence information.

A doubleword wide bidirectional data bus is provided between each BSM 60 to 67 in main storage and corresponding SCE port, and from SCE ports to I/O channel processor 40 and each of the corresponding CPs 10 to 13. Along with the data busses, there are also separate sets of command busses for control and address signals. When a CP encounters a cache miss for a DW access request, its BCE initiates a line access request to main storage by sending a miss command to SCE 30, which then reissues the command to a required BSM in main storage. In the event of a BSM busy condition, SCE 30 will save the request in a command queue and will reissue it at a later time when the required BSM 60 to 67 becomes available. SCE 30 also sequences the main storage commands in an orderly fashion so that all commands to a particular BSM are issued in first-in, first-out (FIFO) order, except when a cache conflict is found by its XI logic. During the normal sequence of handling a main storage request, SCE 30 constantly monitors the status of main storage, analyzes the interrogation results of protection key and all cache directories, examines updated status of all pending commands currently being held in SCE 30, and also looks for any new BCE commands that may be waiting in BCE 20 to 23 to be received by SCE 30.

SCE 30 maintains a plurality of store stacks ($SS_0$, $SS_1$, $SS_2$, and $SS_3$) 35, 36, 37, and 38, each for holding of main storage store requests of up to 16 DWs for a corresponding CP. SCE 30 keeps enough directory information for the store stacks for the indication of main storage addresses and validity. When a store stack risks overflow, SCE 30 sends a priority request to the associated BCE 20 to 23 to hold the sending of more store requests until the BCE receives a later signal from SCE 30 clearing the store stack full condition. Data in the store stacks are updated to main storage with appropriate scheduling maintaining the incoming order within each store stack. A line fetch request from a CP is held by SCE 30 until the SCE makes sure that all existing stores to the line in the store stacks have been sent to the associated BSM 60 to 67.

Figure 2:
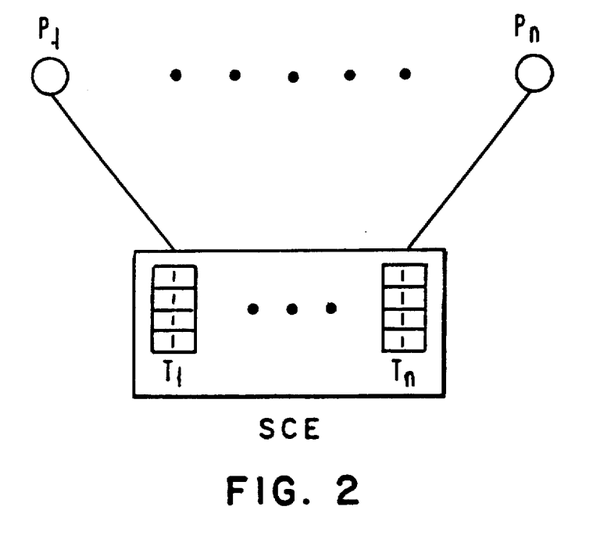
FIG. 2 is a block diagram showing that portion of the multi-processing system of FIG. 1 comprising a plurality of processors and the storage control element (SCE), illustrating lock tables for each processor.
Figure 3:
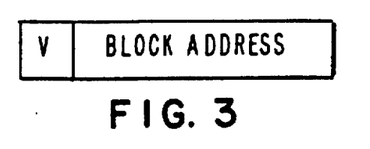
FIG. 3 is a block diagram showing a format of an entry in a lock table according to one aspect of the invention.

The conventional way of recording EX states in cache directory entries can be quite costly. For instance, consider a second level cache with 32K entries. If the SCE maintains three bits per second level entry for the EX status, it requires 100K bits, plus the required bits in first level directories. It is possible to reduce such circuit costs by using relatively small lock tables $T_1$ to $T_n$, as illustrated in FIG. 2. In the MP system of FIG. 2, for each processor $P_i \{P_i | 1 \leq i \leq n\}$, the SCE maintains a lock table $T_i$, which is normally structured as a set-associative table indexed (or hashed) via addresses or can be implemented as a simple first-in, first-out (FIFO) stack. For each entry of $T_i$, there is an ID field (plus an appropriate validity tag), which records the address of a block B, as generally illustrated in FIG. 3. The SCE also maintains the necessary status arrays for replacement operations on the lock tables. Each entry of the lock table $T_i$ represents the EX locking of a block for processor $P_i$. Initially, all entries in the lock tables are invalid. The block size b need not be the same as the first or second level cache line size, although it is normally an integral multiple of the first level cache line size.

Consider the store synchronization mechanism at the SCE for typical ST caches, in which each store from a CP needs to be synchronized with the SCE. The basic operations at the SCE are as follows. First consider the handling by the SCE for store synchronization request (on block B) from processor $P_i$:

(a.1) When block B hits in lock table $T_i$, the store synchronization is granted to processor $P_i$ immediately.

(a.2) When block B is not in any of the lock tables, the SCE creates a new entry for B in lock table $T_i$ and grants the store synchronization to processor $P_i$. In parallel to the above process, the SCE also sends out signals (to CPs that may contain data of block B) to XI-invalidate B in remote caches.

(a.3) When block B hits to lock table $T_j$ ($j \neq i$), this is similar to Remote-EX-hit at the SCE. In this case, the entry of block B is deleted from lock table $T_j$ while a new entry is created in lock table $T_i$ (with XI-invalidate signal sent to processor $P_j$).

Then consider the operations when the SCE receives a fetch request (e.g., a first level cache miss) for a line in block B from processor $P_i$.

(a.4) When block B is not locked EX by remote CPs, the fetch can be initiated without delay.

(a.5) When block B hits to lock table $T_j$ (where $j \neq i$), the block B entry is invalidated from lock table $T_j$ first.

In the store through cache design, it is important that a line (miss) fetch be carried out without any stores to the line pending in store stack(s). This kind of checking by the SCE is needed when a line fetch request is received.

Among the above steps, (a.1) may be done in parallel for multiple stores from different CPs. Proper serialization may be needed at the SCE when other steps are executed, although this does not preclude the possibility of performing more than one store synchronization request in the same cycle. As the locking granularity b becomes bigger (e.g., 4K), the XI-invalidates, from steps (a.2) and (a.3), will cause severe first level cache misses.

Figure 4:
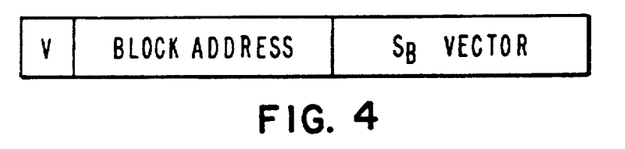
FIG. 4 is a block diagram showing a format of an entry in a lock table according to another aspect of the invention.

The severe XI-invalidates mentioned above may be reduced significantly by employing a $S_B$-bit vector to filter out successive invalidates on the same line. The format is shown in FIG. 4. This vector is used as a BIAS (buffer invalidation address stack)-like filter for invalidate broadcasts. Each bit in the vector may represent multiple (e.g., 2) lines in a block B, in which case each XI signal may invalidate more than one line in each involved remote cache. With the bit-vector filtering, step (a.1) may be modified such that a cache "line" invalidate is sent to remote BCEs when the associated bit-vector at, say, lock table $T_i$ does not indicate previous stores in the line from processor $P_i$.

Figures 5, 6:
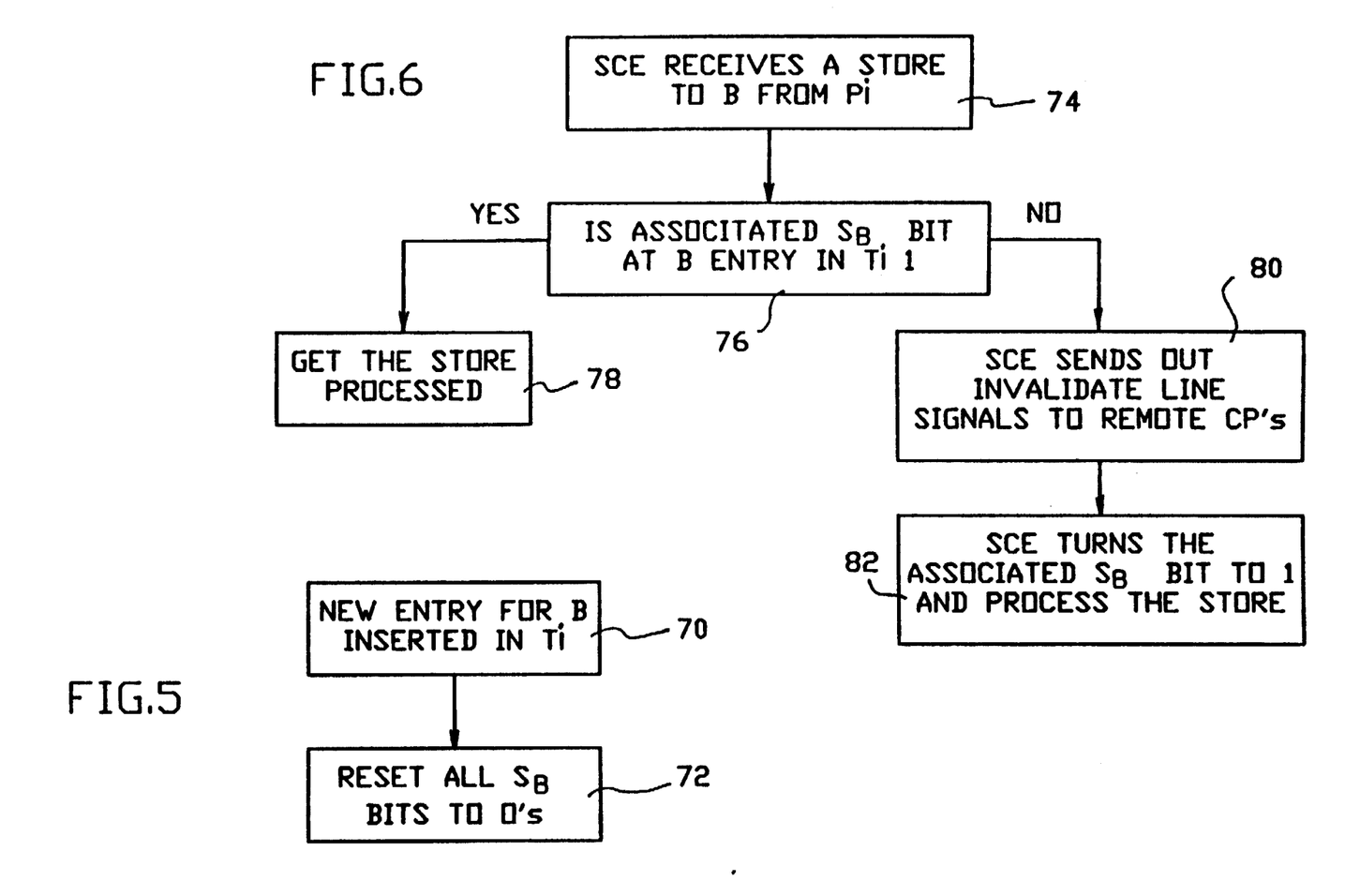
FIGS. 5 and 6 are flow diagrams illustrating the logic of an implementation of the invention using $S_B$ bit-vectors to provide store synchronization.

FIGS. 5 and 6 are flow charts illustrating the logic for the SCE's invalidate filtering based on such bit-vectors. The process begins in FIG. 5 where, in function block 70, a new entry for a block B is inserted in lock table $T_i$. When this occurs, all $S_B$ bits of the bit-vector are reset to zeroes in function block 72. Next, with reference to FIG. 6, the SCE receives a STORE to block B from processor $P_i$ in function block 74. A test is made in decision block 76 to determine if the associated $S_B$ bit of the bit-vector at the block entry in lock table $T_i$ is a one. If so, the STORE is processed in function block 78; otherwise, the SCE sends out invalidate line signals to remote central processors in function block 80. Then, in function block 82, the SCE turns the associated $S_B$ bits to a one and processes the STORE.

The lockup mechanism described above is different from the buffer invalidation address stack (BIAS) filter memory method used in the IBM 3033 MP system as described in the aforementioned U.S. Pat. No. 4,142,234 to Bean et al. The BIAS itself is simply a stack of invalidate signals received by a BCE. In the BIAS filter memory scheme, the SCE maintains, for each processor $P_i$, a table $I_i$ that records the blocks which have been recently invalidated from processor $P_i$ without refetching. Each store request from processor $P_1$ needs to be checked against all entries in a table $I_j$ ($j \neq i$) simultaneously for XI-invalidate possibilities. As the number of processors grows, this simultaneous checking becomes a heavy burden. In the lock table approach, most stores will hit to the lock table $T_i$ associated with the CP $P_i$, and hence with much higher concurrency in SCE handling. Furthermore, at any moment of time, a recently stored block ID will reside in most of the remote tables $I_j$ in the BIAS filter memory approach. The lock tables $T_j$ record only the recent stores from the respective CPs, and are disjoint from each other (except for invalid entries). As a result, the lock tables $T_j$ can utilize circuits more effectively.

Figure 7:
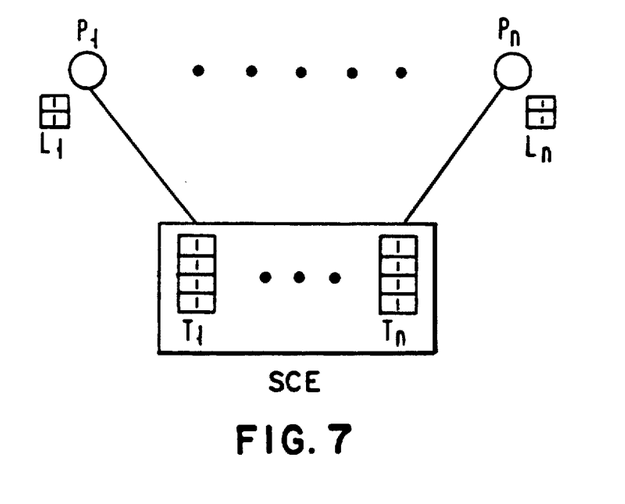
FIG. 7 is a block diagram similar to FIG. 2 showing local lock tables at the processors.

In future processors, in which pipelines are pushed much harder, the delay of store synchronization can be rather costly to pipeline performance. Therefore, it is beneficial to provide proper EX locking at the BCE level so that frequencies of store synchronization to SCE may be reduced. In the above described SCE lockup design, a block locked in lock table $T_i$ actually means that it cannot reside in any of the remote caches (for $P_j$, $j \neq i$). If such locking information is passed to the BCE, it is possible to eliminate the handshake with the SCE for stores to locally locked blocks. In FIG. 7, a local lock table $L_i$ is maintained by the BCE for each processor $P_i$. Each entry of a local lock table $L_i$ records the ID of a block that is locked to EX by processor $P_i$. Normally, the local lock table $L_i$ does not have more entries than lock table $T_i$. The operations for stores and locking is as follows:

(b.1) Initially all entries in the local lock table $L_i$ are invalid.

(b.2) When a store from processor $P_i$ hits to a block B locked in a local lock table $L_i$, the store may be carried out without delay.

(b.3) When a store to block B from processor $P_i$ misses in local lock table $L_i$, the BCE sends a synchronization request to the SCE. Upon receiving the granting signal from the SCE, a valid entry for block B is created in local lock table $L_i$.

(b.4) When processor $P_i$ receives a release request for block B from the SCE, the BCE of processor $P_i$ invalidates the entry of block B from local lock table $L_i$, if such an entry is found. An acknowledge signal is then sent to the BCE.

As far as the BCE is concerned, no special handling is required for usual fetches (non-EX type). As far as the SCE is concerned, one major difference is on the handling of Remote-EX-hits. Consider the situation in which an access to block B from processor $P_i$ hits to lock table $T_j$, where $j \neq i$.

(b.5) The SCE signals processor $P_j$ to release the EX lock on block B, if block B is possibly locked in local lock table $L_j$. (Note that lock table $T_j$ is not prevented from carrying more lock entries than local lock table $L_j$.) This signal may be coupled with appropriate XI-invalidate request (e.g., when the access from processor $P_i$ is for EX status). The SCE does not complete such XI action until it receives the acknowledge signal from processor $P_j$ (see step (b.4)).

Figure 8:
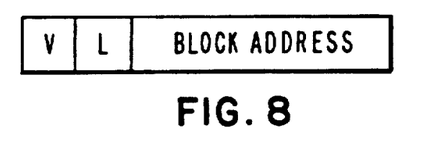
FIG. 8 is a block diagram similar to FIG. 3 illustrating the format of an entry into a lock table according to a further aspect of the invention.

It is desirable to keep the locking information in local lock table $L_i$ a subset to that in lock table $T_i$. The SCE can detect whether a block in an SCE EX lock table $T_i$ is in the corresponding BCE local lock table $L_i$ or not by adding one extra L-bit per $T_i$ table entry, as illustrated in FIG. 8. However, this is not required if local lock table $L_i$ and lock table $T_i$ have the same size. It suffices to guarantee that, when an entry is deleted from lock table $T_i$, the corresponding block will not exist in local lock table $L_i$. An entry of lock table $T_i$ may be deleted from table $T_i$ due to two reasons; a cross-interrogate (XI) and replacement due to a local request. The XI handling (e.g., step (b.5) above) does preserve the subset rule properly. For local replacements, it is clear that, an entry is replaced from lock table $T_i$ only due to an EX request from processor $P_i$. The foregoing assumes conventional XI-invalidate methods; that is, when a block B is locked EX from processor $P_i$, any existing first level lines covered by block B in remote caches will be invalidated. When the block size is bigger than the first level block size, this often results in redundant XI-invalidates (i.e., lines get invalidated without being modified at other CPs). The overhead due to extra cache misses and directory handling becomes intolerable when the block size is much (e.g., sixteen times) bigger than the line size.

From experiments, significant spatial localities have been observed for both fetches and stores. Performing EX locking with bigger granularity blocks is able to reduce the rate of Non-EX-stores significantly. As a result, it is valuable to be able to perform large granularity EX locking without causing the above-mentioned performance overhead. In the following description, for simplicity of presentation, exclusive locking granularity is illustrated by 4K blocks in a multi-processor system with 128 bytes per cache line. In such a case, there are 32 lines in each block. However, it will be understood that these numbers are by way of example only and that different sized blocks, lines and caches may be used in the practice of the invention. Also, for purposes of this description, a store through (ST) cache design is assumed with the SCE keeping track of the exclusive (EX) ownership of storage blocks by each of the several processors in the system. It is also assumed that at each central processor (CP), there is a directory DP to keep track of block information. At each entry for block B in directory $D_P$, there are, at least conceptually, three states, exclusive $EX_B$, temporarily invalid $TI_B$ and read only $RO_B$. Actually, the system only maintains explicitly the EX and TI states for each processor through the EX lock tables, which is of limited capacity. When a BCE detects that a block B is not TI or EX, it simply treats the block as RO itself. Hence, directory DP may be considered as recording TI and EX states. In some implementations, an $INV_B$ state may also be used.

One way for the BCE to obtain authorization information is to duplicate the EX locking information of all CPs from the SCE. Processor $P_i$ has a $TI_B$ state when another CP owns the $EX_B$ state. Let the copy of $\{L_j | 1 \leq j \leq K\}$ kept at the BCE of processor $P_i$ be indicated as $\{L_j^{(i)} | 1 \leq j \leq K\}$. At processor $P_i$ the lock table $L_i^{(i)}$ serves as the local lock table $L_i$ described above. At processor $P_i$, a block B is in $EX_B$ state if it is found in table $L_i^{(i)}$, it is in $TI_B$ state if it is found in a lock table $L_j^{(i)}$ with $j \neq i$, and it is in the $RO_B$ state otherwise. When processor $P_i$ changes from the $TI_B$ state to the $RO_B$ state or $EX_B$ state, the BCE should invalidate the previous remote $EX_B$ state recorded in a lock table $L_j^{(i)}$ ($j \neq i$). When the SCE gives $EX_B$ state to processor $P_i$, it signals the $TI_B$ state to each processor $P_j$ ($j \neq i$) by also sending the coordinate of the block B entry in local lock table $L_i$. Upon receiving such a $TI_B$ signal, the BCE of processor $P_j$ records the status at the specified coordinate in lock table $L_i^{(j)}$. When processor $P_j$ gives up its $EX_B$ (into $RO_B$) due to a $RO_B$ request from processor $P_i$ ($i \neq j$), it is useful, but not necessary, for the SCE to notify the state change to other CPs.

The "local" lock tables $L_j^{(i)}$ could be maintained at the SCE as tables $T_j^{(i)}$ in an alternative embodiment of the invention. There are, however, certain performance and design advantages for allowing the $T_i$ tables to be much bigger than the $L_i$ tables. This implies that the interpretation of EX status may be different between the SCE and the BCEs. Since tables $L_i$ are maintained to be a subset of the tables $T_i$, it is guaranteed that both SCE and BCEs should understand the EX status as long as it is recorded in local lock tables $L_i$. However, depending on implementation, it is not necessary for the BCEs to know about all lock table $T_i$ information. The bigger $T_i$ tables are used by the SCE to have more concurrency in EX status granting to the BCEs and to record status; e.g., the $S_B$ bit-vectors for invalidate filtering.

The EX status recorded in the local lock tables $L_i$ are the only entries subject to cross-interrogate (XI) actions. The lock tables $T_i$ are in essence for the SCE's bookkeeping only. Architecture consistency should be maintained for storage accesses from processors and I/0 channels only. Here, a block B can be RO state to a processor even when block B is recorded in a remote lock table $T_j$, as long as block B is not assigned to a local lock table $L_j$ at a remote BCE.

Figure 9:
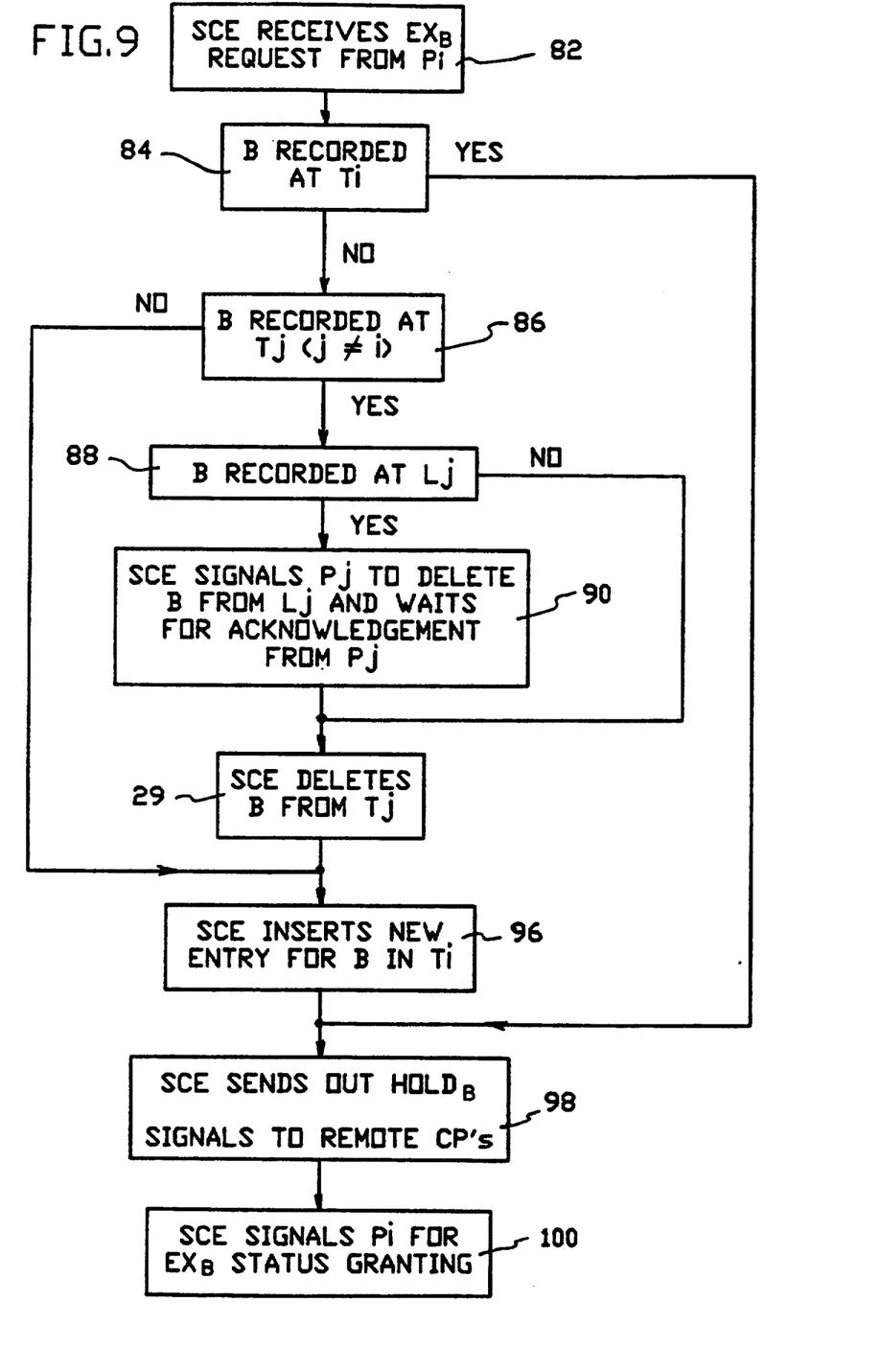
FIGS. 9, 10 and 11 are flow diagrams illustrating the logic of an implementation of the invention.
Figure 10:
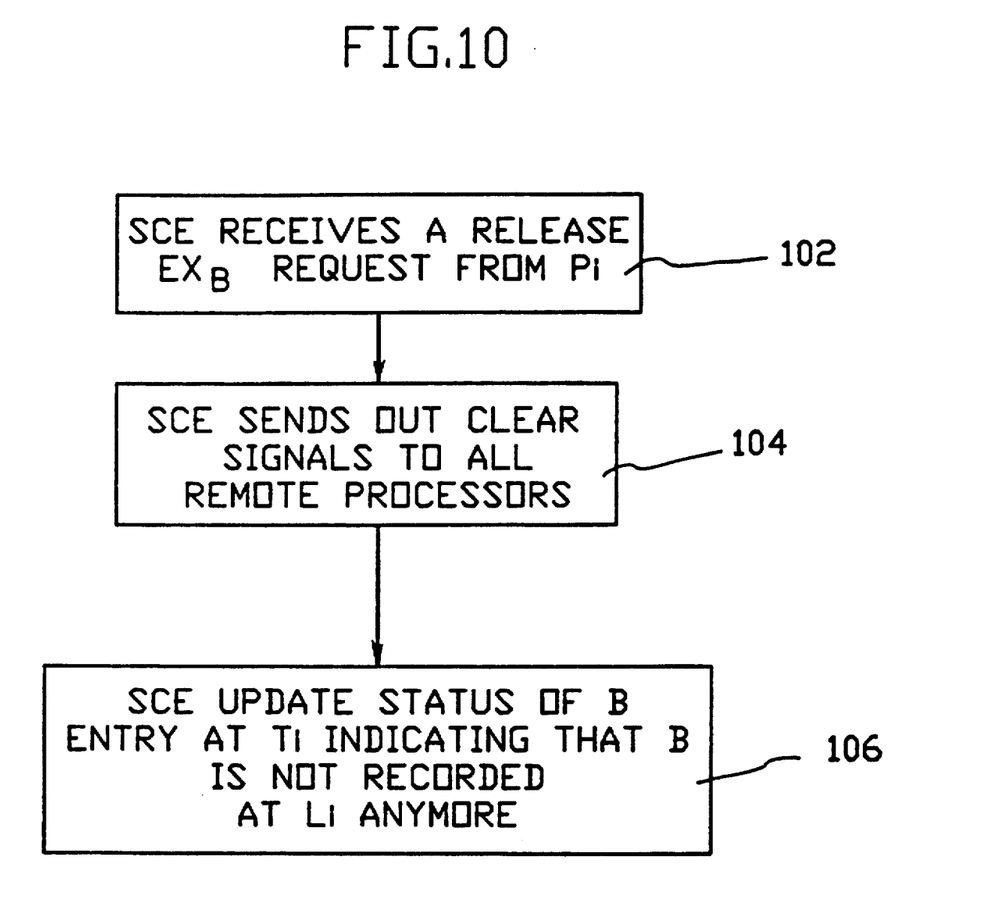
Figure 11:
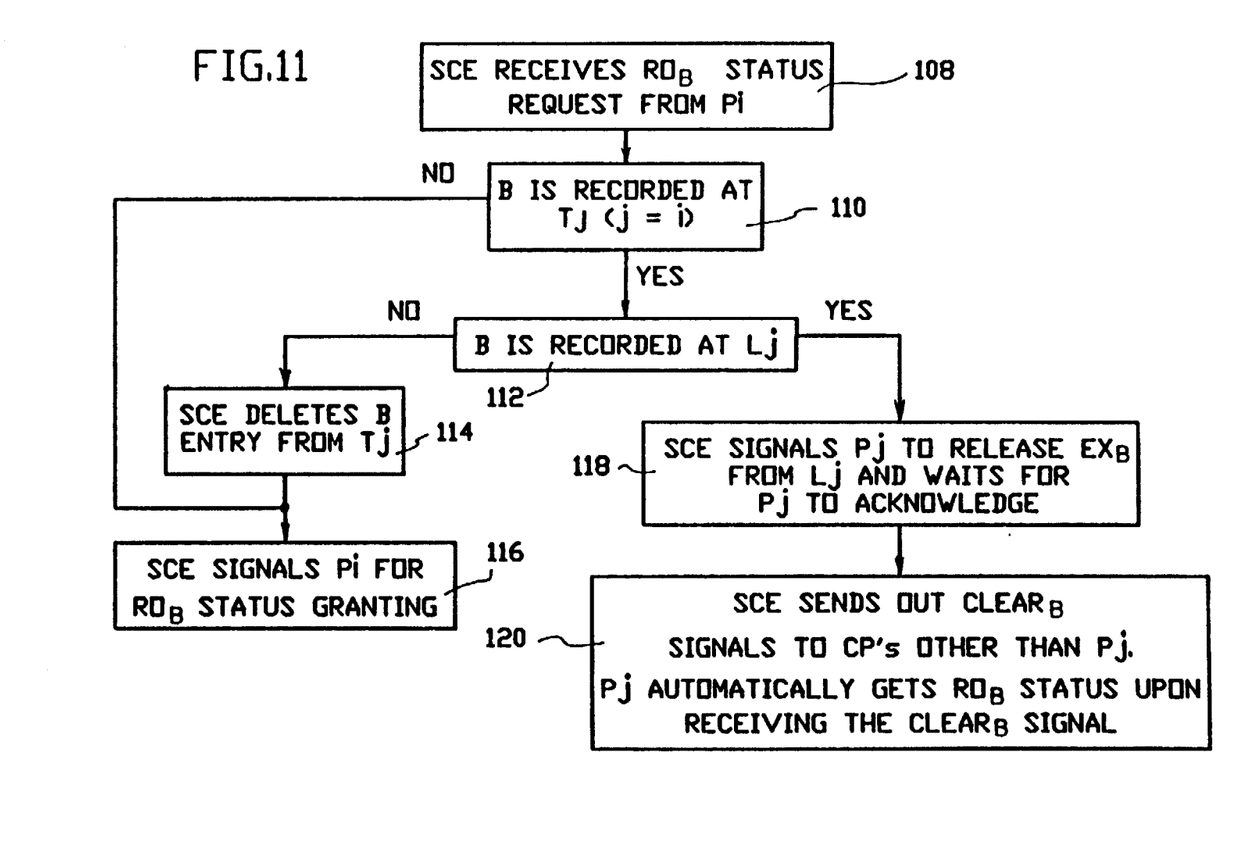

The logic of the process according to the invention is illustrated in the flow diagram shown in FIGS. 9, 10 and 11. In the case shown in FIG. 9, the SCE receives an $EX_B$ request from processor $P_i$ in function block 82. A test is made in decision block 84 to determine if block B is recorded at lock table $T_i$. If so, control goes to function block 98; otherwise, a further test is made in decision block 86 to determine if the block B is recorded at a remote lock table $T_j$, where $j \neq i$. If not, control goes to function block 96, but otherwise, another test is made in decision block 88 to determine if block B is recorded at a remote local lock table $L_j$. If so, the SCE signals processor $P_j$ to delete block B from its lock table $L_j$, and then the SCE waits for an acknowledgement from the processor $P_j$ in function block 90. When the acknowledgement is received or if the test at decision block 88 is negative, the SCE deletes block B from lock table $T_j$ in function block 92. When block B has been deleted or if the test in decision block 86 is negative, the SCE inserts a new entry for block B in table $T_i$ in function block 96. Next, in function block 98, the SCE sends out $HOLD_B$ signals to remote central processors. Finally, in function block 100, the SCE signals processor $P_i$ for granting $EX_B$ status.

In the case illustrated in FIG. 10, the SCE receives a Release $EX_B$ request from processor $P_i$ in function block 102. This causes the SCE to send out $CLEAR_B$ signals to all remote processors in function block 104. Then, in function block 106, the SCE updates the status of the block B entry at lock table $T_i$ indicating that block B is not recorded at the local lock table $L_i$ anymore.

In FIG. 11 the case of an RO status request is illustrated. Here, the SCE receives an $RO_B$ status request from processor $P_i$ in function block 108. A test is made in decision block 110 to determine if block B is recorded at a remote lock table $T_j$, where $j \neq i$. If so, a further test is made in decision block 112 to determine if block B is recorded at a remote local lock table $L_j$. If not, the SCE deletes the block B entry from lock table $T_j$. When the block B entry has been deleted or if the test in decision block 110 is negative, the SCE signals processor $P_i$ in function block 116 for granting $RO_B$ status.

Returning to decision block 112, if block B is recorded at a remote local lock table $L_j$, then the SCE signals processor $P_j$ to release $EX_B$ from its local lock table $L_j$ in function block 118. The SCE then waits for processor $P_j$ to acknowledge. When the acknowledgement is received from processor $P_j$, the SCE sends out $CLEAR_B$ signals to processors other than processor $P_j$ in function block 120. Processor $P_j$ automatically gets $RO_B$ status upon receiving the $CLEAR_B$ signal.

When a CP $P_i$ requests exclusive control of a block B (indicated as the CP has $EX_B$ status) to the SCE (through an access with store intent, or when processor $P_i$ is expected to store into block B soon), the SCE performs the following appropriate operations. First, if the SCE finds that a remote CP, say, $P_j$ owns $EX_B$ state in its local lock table $L_j$, the SCE makes sure that processor $P_j$ gives up its $EX_B$ state before granting $EX_B$ to processor $P_i$. Otherwise, $EX_B$ may be granted to processor $P_i$ right away. Next, the SCE sends out $HOLD_B$ signals to those remote CPs which may own lines of block B in their caches. After receiving such a $HOLD_B$ signal, a remote CP, say, $P_j$ will mark block B with the $TI_B$ state (by recording block B in lock table $L_i^{(j)}$), where the $TI_B$ state means that block B is temporarily invalid for that CP.

When processor $P_i$ accesses block B with the $TI_B$ state through a fetch request, processor $P_i$ needs to ask the SCE for access right. Note that the fetch may be a Fetch-and-Modify request from an interlock instruction. The SCE has any CP holding the $EX_B$ state give it up. After the $EX_B$ state is not owned by any remote CP, the SCE signals processor $P_i$ granting appropriate access right. After receiving authorization from the SCE, processor $P_i$ changes the $TI_B$ state to an appropriate state, e.g., $RO_B$ or $EX_B$, and starts accessing data of block B. Note that for cache miss situations, the SCE may transfer a valid copy of the line to processor $P_i$ at some point so that processor $P_i$ does not need to reissue miss after getting access right.

When processor $P_i$ gives up the $EX_B$ state for whatever reasons, it signals the SCE about the event. If the $EX_B$ state is not currently requested by another CP, the SCE sends CLEAR$_B$ signals to those remote CPs that may be holding TI$_B$ states. After receiving such CLEAR$_B$ signal, a CP, say, P$_j$ clears up its TI$_B$ state (by deleting block B from T$_j^{(j)}$) in order to enable its later accesses to block B.

When a CP P$_i$ stores into a line within a block B under the EX$_B$ state, the SCE broadcasts XI (cross-invalidate) signals to those CPs that may own a copy of that line in their caches.

The SCE may maintain, for each block B that is exclusively (EX$_B$) owned by a CP, say, P$_i$, the following information: (a) Which CP owns the EX$_B$ state. This is used to handle remote EX-hit cross-interrogates. (b) Which lines in B have previously been stored into by P$_i$ since P$_i$ obtained EX$_B$ state the last time. This may be implemented through a bit-vector S$_B$, as described above.

At a CP P$_i$, each entry (say, for Block B) in the local lock table L$_i$ may keep information on which lines in block B have previously been stored into by processor P$_i$ since P$_i$ obtained the EX$_B$ state the last time. This may be implemented through a bit-vector similar to that described for the SCE. When such vectors are implemented at local CPs, it may not be necessary to use that vector described above. This implementation is most beneficial for store-in cache designs.

When a CP gives up its EX$_B$ control, the SCE need not send out CLEAR$_B$ signals to other CPs right away. This may cause other CPs to consult with the SCE upon the first reference to B later on.

The SCE should properly serialize the processing of EX$_B$ state granting and cross-invalidating.

The implementation of states may use different bits For instance, a TI$_B$ state may be implemented using a separate flag bit. In some situations, this may be convenient.

It is important to be able to have effective filtering of remote cache line invalidate signals. Other than the S$_B$ bit-vectors described above, it can be beneficial to have other filtering devices. For instance, The copy directory (CD) technique proposed by C. K. Tang or the presence tags proposed by L. M. Censier et al. may be used as a secondary filtering when the described S$_B$ bit-vector fails to eliminate remote invalidates. The EX status guaranteed by the local tables for a store allows the SCE more time to carry out secondary filtering without causing data consistency problems.

It is not a necessity for every storage, i.e., cache, access to search all the lock tables L$_j^{(i)}$, which could cause severe performance problems. Instead, these lock tables L$_j^{(i)}$ may serve as a backup status directory when needed by the BCE. For instance, the processor BCE may implement a smaller directory for most recently accessed blocks with the proper status (RO or EX) recorded per entry. With large granularity blocks, the hit ratio to such a directory is expected to be very high. The lock tables L$_j^{(i)}$ need to be searched only when an accessed block cannot be located in the directory. In this way, the BCE may operate most of the time on lock tables L$_j^{(i)}$ in parallel to the actual storage accesses from the IE units.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. In a tightly coupled multi-processor system of the type comprising a plurality of central processors, a main storage and a storage control element connected to said main storage, each central processor having a buffer control element including a store through cache, a method for providing large granularity locking of exclusivity of a block of data in caches of said central processors comprising the steps of:

reading from or writing to said main storage units of data under the control of said storage control element by said buffer control elements in response to requests by said central processors;

storing by said buffer control elements in their respective caches a plurality of blocks of data read from said main storage, each of said blocks of data comprising a plurality of cache lines and each cache line having a plurality of units of data;

establishing by said storage control element three possible states on a block of data, said states including a temporarily invalid state, a read only state and an exclusive state, the temporarily invalid state being the initial state for all blocks of data in caches of said central processors;

recording by said storage control element states of blocks of data for the central processors at the storage control element and the buffer control elements, said recording at the storage control element being in lock tables, one for each central processor, to keep track of ownerships of exclusive states of blocks of data, and said recording at the buffer control elements being in local lock tables to maintain a subset of a corresponding lock table exclusive status of blocks of data for that central processor;

enforcing by said storage control element a unique access right to a block of data in a cache for one of said central processors by giving other central processors said temporarily invalid state on said block of data, even though some lines in the block of data may still be resident in caches of said other central processors; and for any central processor trying to access said block of data in a temporarily invalid state, communicating by the accessing central processor with the storage control element to obtain proper authorization, the storage control element changing the temporarily invalid state on the block of data for the accessing central processor to a read only or exclusive state to grant authorization to the accessing central processor.

2. The method of providing large granularity locking according to claim 1 further comprising the steps of:

when a central processor P$_i$ attempts to store into a line L in a block of data B and the central processor P$_i$ does not have an exclusive state for the block of data B, requesting by the buffer control element for said central processor P$_i$ an exclusive state for the block of data B from the storage control element;

if this is a first store into said line L since the central processor P$_i$ obtained an exclusive state of said block of data B, communicating by said storage control element an XI-invalidate signal for the line L from caches at other central processors, a line being XI-invalidated from a cache only when it is actually modified remotely so as to minimize invalidates.

3. The method of providing large granularity locking according to claim 2 wherein the step of communicating the XI-invalidate signal is also done when the storage control element grants an exclusive state for the block of data B to the central processor $P_i$.

4. The method of providing large granularity locking according to claim 2 wherein the step of enforcing comprises the step of requesting by the buffer control element for the central processor $P_i$ a read only state for the block of data B from the storage control element before accessing, even for a cache hit, when a central processor $P_i$ fetches data in a block of data B with a temporarily invalid state.

5. The method of providing large granularity locking according to claim 4 further comprising the steps of:
   when the storage control element receives an exclusive request from a central processor $P_i$ for a block of data B, signaling by the storage control element a temporarily invalid state for the block of data B to all remote central processors before granting an exclusive state for the block of data B to the central processor $P_i$; and
   if a remote central processor $P_j (j \neq i)$ owns the exclusive state for the block of data B, communicating by the storage control element to the central processor $P_j$ a temporarily invalid state for the block of data B before granting the exclusive state for the block of data B request to the central processor $P_i$.

6. The method of providing large granularity locking according to claim 5 further comprising the steps of:
   when the storage control element receives a read only request for a block of data B from a central processor $P_i$, granting by the storage control element the request right away if no remote central processor owns an exclusive state for the block of data B;
   otherwise, granting by the storage control element the read only request after communicating to a remote control processor $P_j$ to turn its exclusive state for the block of data B into a read only state for the block of data B.

7. The method of providing large granularity locking according to claim 1 wherein the step of recording at the storage control element comprises the steps of:
   maintaining a bit vector CH (change-local) for each block of data B locked exclusive for a central processor $P_i$, when it is actually stored by the central processor $P_i$ since the last time the exclusive state for the block of data B is granted to the central processor $P_i$;
   initializing the vector CH to zero bits when central processor $P_i$ acquires the exclusive state for the block of data B; and
   when a store into a line L of block of data B is received by the storage control element, sending out by the storage control element XI-invalidate signals to remote caches if the vector CH associated with the line L is OFF, and then turning the vector CH for the line L ON by the storage control element.

8. A tightly coupled multi-processor system comprising:
   a plurality of central processors;
   a main storage;
   storage control means connected to said main storage and including a plurality of lock tables corresponding to said plurality of central processors, said lock tables maintaining a record of exclusive states of blocks of data by respective ones of said plurality of central processors;
   a plurality of buffer control elements, one for each of said central processors, the buffer control element of each central processor reading from or writing to said main storage units of data via said storage control means, each said buffer control element including a cache storing a plurality of blocks of data, each of said blocks of data comprising a plurality of cache lines and each cache line having a plurality of units of data, said buffer control element including local lock tables which maintain a subset of a corresponding lock table exclusive status of blocks of data for that central processor;
   said storage control means establishing three possible states on a block of data, said states including a temporarily invalid state, a read only state and an exclusive state, the temporarily invalid state being the initial state for all blocks of data in caches of said central processors;
   said storage control means further recording states of blocks of data for the central processors in said plurality of lock tables at the storage control element and said local lock tables at the buffer control elements to keep track of ownerships of exclusive states of blocks of data;
   said storage control means enforcing a unique access right to a block of data in a cache for one of said central processors by giving other central processors said temporarily invalid state on said block of data, even though some lines in the block of data may still be resident in caches of said other central processors and, for any central processor trying to access said block of data in a temporarily invalid state, communicating with the accessing central processor and changing the temporarily invalid state on the block of data for the accessing central processor to a read only or exclusive state to grant authorization to the accessing central processor on the block of data to provide large granularity locking of exclusivity of blocks of data in said caches.

9. The tightly coupled multi-processor system according to claim 8 wherein said buffer control element for each processor comprises means for requesting from said storage control means a read only or exclusive state for a block of data for t he corresponding central processing unit before accessing the block of data, even for a cache hit, when the central processor attempts to fetch data in a block of data with a temporarily invalid state as indicated by the local lock table for the buffer control element.

* * * * *